United States Patent [19]
Disselkoen et al.

[11] Patent Number: 5,999,123
[45] Date of Patent: *Dec. 7, 1999

[54] TIME-RELATIVE POSITIONING FOR STATIC APPLICATIONS

[75] Inventors: Brent Disselkoen, Cedar Rapids; Patrick Hwang, Marion; Karl Ulmer, Cedar Rapids, all of Iowa

[73] Assignee: Rockwell International Corporation, Costa Mesa, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/527,605

[22] Filed: Sep. 13, 1995

[51] Int. Cl.$^6$ .......................................... G01S 5/08
[52] U.S. Cl. ....................................... 342/357.08
[58] Field of Search .................... 342/357, 442, 342/443; 364/449.7, 449.8, 449.9

[56] References Cited

U.S. PATENT DOCUMENTS 5,021,792  6/1991  Hwang ................................. 342/357
5,266,958  11/1993  Durboraw, III ..................... 342/357

*Primary Examiner*—Gregory C. Issing
*Attorney, Agent, or Firm*—Kyle Eppele; James P. O'Shaughnessy

[57] ABSTRACT

A system of utilizing a single radio receiver with continuously broadcast GPS signals in order to determine precise relative positioning between two arbitrary positions or to determine current position. The invention includes utilizing changes in the carrier signal as detected by the GPS receiver occurring as a result of the movement from a first position to a second position.

9 Claims, 2 Drawing Sheets

TIME-RELATIVE POSITIONING FOR STATIC APPLICATIONS

FIELD OF INVENTION

The present invention relates generally to GPS navigation satellite systems and more particularly to systems which make use of the carrier phase of signals provided by GPS satellites.

BACKGROUND OF THE INVENTION

GPS navigation systems include use of a constellation of satellites each of which provides a coded signal which may be picked up by radio receivers in close proximity to the earth. Separate coded signals from a set of satellites may be processed by a receiver for use in determining location as defined by latitude and longitude based upon the code carried by the signals. The operation of the GPS receiver in determining location based on coded signals received from satellites reflects the conventional functioning of such systems.

During the course of time, alternative uses of the GPS satellite system have been developed by various users. One such use of GPS signals is in determining ones spatial orientation as described in U.S. Pat. No. 5,021,792, issued to one of the inventors of the present application, and incorporated herein by reference. The spatial orientation system of the '792 patent requires the use of multiple receivers and is based upon mathematical derivations of phase measurements of the carrier signal.

Although the above referenced spatial orientation system works well as described, it requires the use of duplicative hardware, such as receivers and antenna and the associated control devices for enabling and orchestrating such a system.

Accordingly, it has long been the goal of numerous entities to develop and refine secondary uses for the GPS system that minimize hardware requirements, preferably operable from a single GPS receiver.

SUMMARY OF THE INVENTION

The present invention constitutes a system for determining relative position, utilizing a single radio receiver based upon monitoring changes in the phase measurements of a given carrier signal. A method is described in which GPS navigation signals are monitored from a first given point to a second given point. The position relationship of the two given points is determined from the measurements observed from a specifically acquired plurality of GPS spacecraft. Upon arrival at the second given position, weighting factors are applied for various systemic parameters. Upon calculation of a vector representing the direct line between the first and second positions, the magnitude and direction of the vector is determined and utilized in an application, such as surveying.

An alternate embodiment of the above method includes a calibration procedure at initial fix determination that aids in the reduction of system induced errors in the vector measurement.

It is an object of the present invention to provide a simplified system for accurately and efficiently accomplishing relative positioning guidance with the use of widely available navigation radio signals.

It is a feature of the present invention to utilize the mathematical relationships between phase angles of carrier signals from a given constellation of navigation signals.

It is an advantage of the present invention to provide real time or post processed, accurate, relative positioning information with the use of a single GPS receiver.

These and other objects, features and advantages are disclosed and claimed in the specification, figures and claims of the present application.

DESCRIPTION OF THE PREFERRED EMBODIMENT

Figure 1:
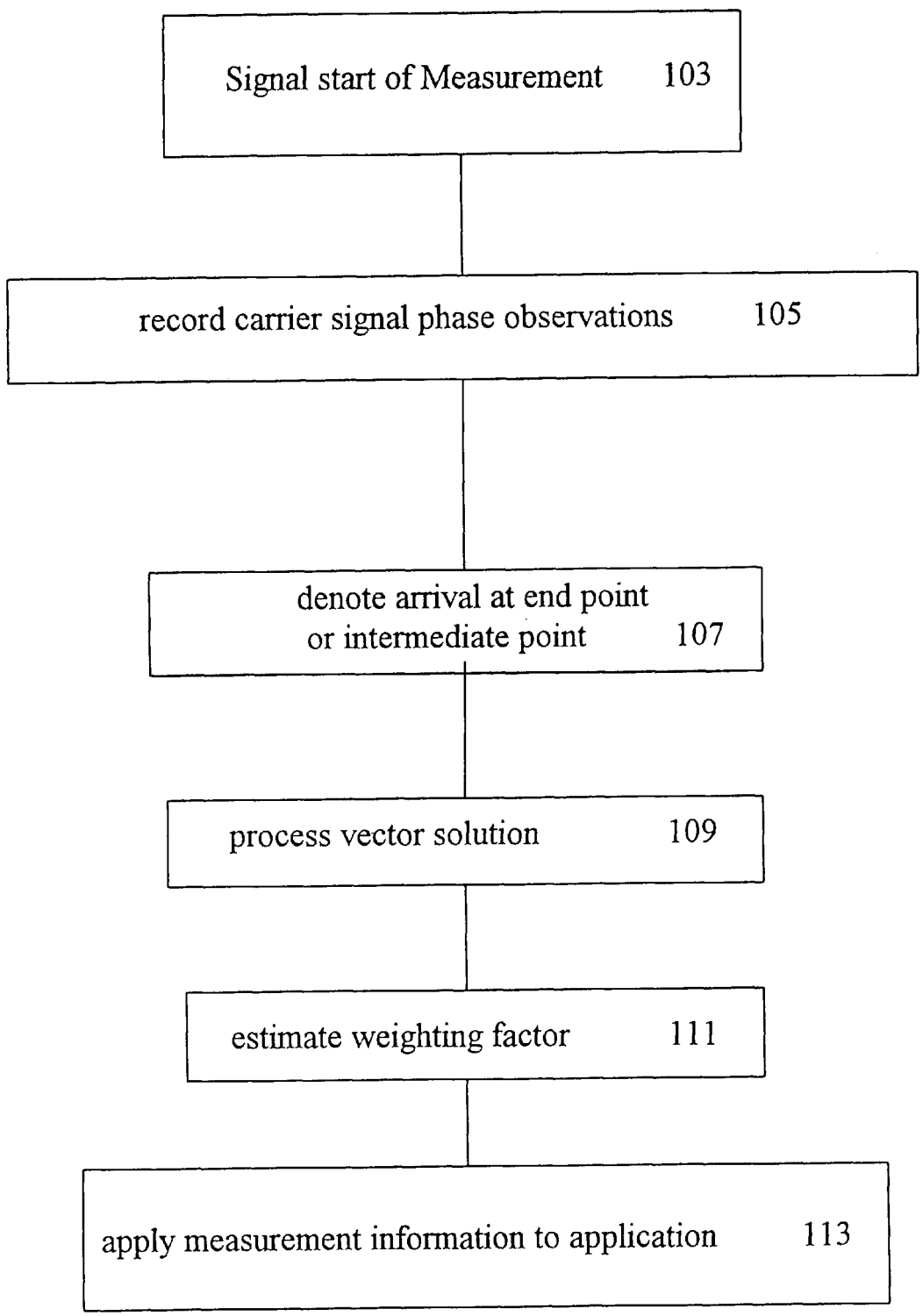
FIG. 1 illustrates a flowchart of the steps of the method of the present invention.

Referring now to the drawings, wherein like items are referenced as such throughout, FIG. 1 illustrates a flowchart of one embodiment of the steps of the method of the present invention. Initially, an operator utilizing a GPS receiver having processing capability for performing the subsequently described calculations (such as a portable unit available from the assignee of this document) signals the start of a measurement, step 103. Next, carrier signal phase observations for each of the satellite signals are recorded, step 105. During the traversal from the first mark, or position, to the next, the operator needs to ensure that the signals from the primary satellites in track are not obscured to ensure optimal measurement quality. While traversing, the receiver unit may be used to process an intermediate vector solution that represents the straight line adjoining the first mark or point of origination and the current position. The intermediate vector solution represents the current relative position and can be utilized for any given application. The operator makes a key entry upon arrival at the destination mark, or second position to end the relative positioning operation, step 107. Next, the receiver unit processes a vector solution that represents the straight line adjoining the two marks that had been occupied, step 109. A quality factor (or weighting factor) representing accuracy of the solution should also be posted with the solution, step 111. Any functional anomalies, such as cycle slips, data bit parity errors or the like, occurring during the traversal between marks should be detected and corrected by applying existing correction estimation schemes that rely on redundant observable parameters or external aiding measurements. Finally, the resultant accepted vector is utilized in a given application, step 113, such as surveying.

Figure 2:
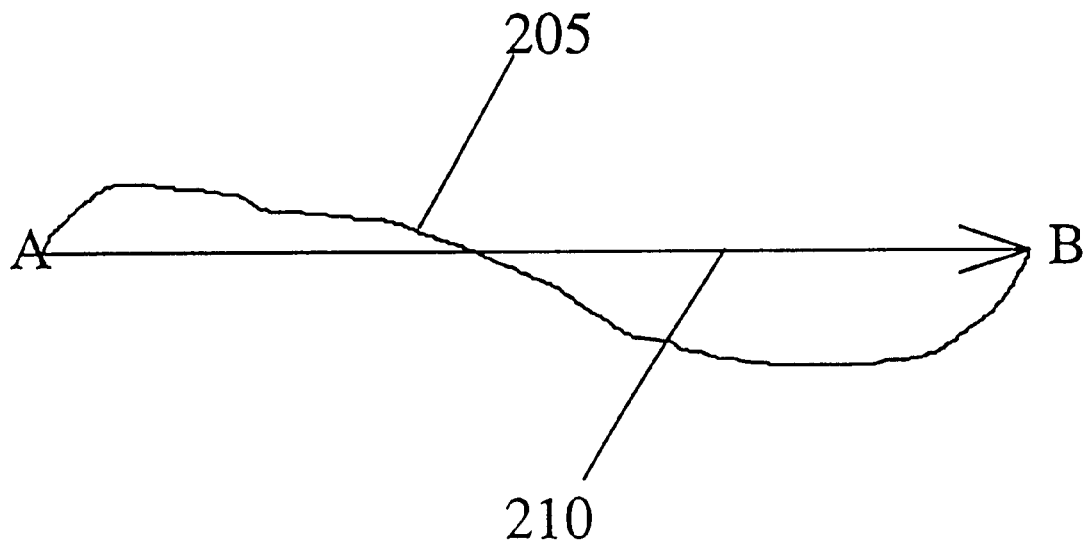
FIG. 2 illustrates a two dimensional example representation of the teachings of the present invention.

FIG. 2 illustrates a two-dimensional representation of time-relative positioning. A first mark, point A represents a beginning point for an operator having a GPS receiver. The operator travels from point A to point B along the line identified as 205. Upon arrival at the end-point, B, an accepted pointing vector, 210 is determined and applied to the underlying application such as land surveying.

Time-relative positioning relies upon tracking the continuous carrier phase of a signal in order to determine relative change in position, the accuracy of which depends on the stability of the GPS carrier signal over the time interval involved. The measurement equation for each satellite may be described mathematically as, $\phi(t_k)-\phi(t_0)=[r_k+N]-[r_0+N]$, which is equivalent to:

$$[(t_k)-\phi(t_0)]-[d(x^*, t_k)-d(x^*, t_0)]=h(t_k)\cdot[x(t_k)-x^*]-h(t_0)\cdot[x(t_0)-x^*] \qquad \text{Eq. \#1}$$

where, $\phi(t_k)$=carrier phase at $t_k$ (end point)
$\phi(t_0)$=carrier phase at $t_0$ (beginning point)
$r_k$=range plus range biases at $t_k$
$r_0$=rang plus range biases at $t_0$
N=integer cycle ambiguity
$h(t_k)$=direction cosines at $t_k$
$h(t_0)$=direction cosines at $t_0$
$x(t_k)$=antenna position at $t_k$
$x(t_0)$=antenna position at $t_0$
$x^*$=true antenna position at to (unknown to user)
$d(x^*, t_k)$=geometric range from $x^*$ to satellite plus deterministic biases at $t_k$
$d(x^*, t_0)$=geometric range from $x^*$ to satellite plus deterministic biases at $t_0$
Written in a different way equation #1 becomes:

$$[\phi(t_k)-\phi(t_0)]-[d(x^*, t_k)-d(x^*, t_0)]=h(t_k)\cdot[x(t_k)-x(t_0)]+[h(t_k)-h(t_0)]\cdot[x(t_0)-x^*] \quad \text{Eq. \#2.}$$

The second term on the right-hand side representing the assumed position error $[x(t_0)-x^*]$ can be ignored since no change in the term would be observable over a short time interval, such as 100 seconds. In addition, $[h(t_k)-h(t_0)]$, is very nearly zero so its contribution is small over a short time interval. Thus, ultimate solution of equation #2, simply consists of solving for the term $[x(t_k)-x(t_0)]$.

Additionally, if one combines the carrier phase observation and deterministic biases into the term $\Phi(t)$, where $\Phi(t)=\phi(t)-d(x^*,t)$ then equation #2 reduces to:

$$\Phi(t_k)-\Phi(t_0)=h(t_k)\cdot[x(t_k)-x(t_0)] \quad \text{Equation \#3.}$$

The solution for $[x(t_k)-x(t_0)]$ is then obtained by solving equation #3, simultaneously, from a group of satellites, in this instance four satellites, set forth as follows.

$$\begin{bmatrix} \Phi_1(t_k)-\Phi_1(t_0) \\ \Phi_2(t_k)-\Phi_2(t_0) \\ \Phi_3(t_k)-\Phi_3(t_0) \\ \Phi_4(t_k)-\Phi_4(t_0) \end{bmatrix} = \begin{bmatrix} h_1(t_k) \\ h_2(t_k) \\ h_3(t_k) \\ h_4(t_k) \end{bmatrix} \cdot \begin{bmatrix} x(t_k)-x(t_0) \\ y(t_k)-y(t_0) \\ z(t_k)-z(t_0) \\ t(t_k)-t(t_0) \end{bmatrix}$$

The solution for $[x(t_k)-x(t_0)]$ is given by;

$$\begin{bmatrix} x(t_k)-x(t_0) \\ y(t_k)-y(t_0) \\ z(t_k)-z(t_0) \\ t(t_k)-t(t_0) \end{bmatrix} = \begin{bmatrix} h_1(t_k) \\ h_2(t_k) \\ h_3(t_k) \\ h_4(t_k) \end{bmatrix}^{-1} \cdot \begin{bmatrix} \Phi_1(t_k)-\Phi_1(t_0) \\ \Phi_2(t_k)-\Phi_2(t_0) \\ \Phi_3(t_k)-\Phi_3(t_0) \\ \Phi_4(t_k)-\Phi_4(t_0) \end{bmatrix}$$

The above is a least-squares solution without any need for filtering because the measurement noise of the carrier phase data is already very small in relation to other errors. This comparison can be seen in an error budget table given below that assumes a 100 second time interval between the first and second mark.

TABLE 1

Error Budget for Time Relative Positioning

| ERROR SOURCE | RMS RANGE ERROR (100 second time interval) |
|---|---|
| Satellite Frequency Error | $10^{-12}$ s/s * $3(10^8)$ m/s * 100 s = 0.03 m |
| Selective Availability[+] | ≈ 0 |
| Iono Delay Changes | ≈ 0 |
| Tropo Delay Changes | ≈ 0 |
| Assumed Position Error | 0.00019 /s * 10 m * 100 s = 0.19 |
| Multi-path Error[++] (worst case) | 0.05 m |
| Carrier Tracking Noise[++] (dependent upon C/N$_0$) | 0.004–0.006 m |
| Root Sum of Square Errors | 0.20 m |
| Horizontal Dilution of Precision | 1.5 |
| Horizontal Relative Position Error (rms) | 0.30 m |
| Horizontal Relative Position Error (95%) | 0.60 m |

[+]eliminated via authorized GPS receivers
[++]Independent of time interval

To further examine the worst case situation due to the assumed position error, we can assume that the largest change in the satellite geometry occurs when a satellite is overhead of the observer who is in the plane of the satellite orbit. From that, the worst case satellite geometry rate of change $[h(t_k)-h(t_0)]$ is about 0.00019 per second. Alternatively, the precise value of the geometric rate of change may be independently calculated or obtained. If the assumed position error $[x(t_0)-x^*]$ is 10 meters, then the error contribution of $[h(t_k)-h(t_0)]\cdot[x(t_0)-x^*]$ from equation #2 over 100 seconds is 0.00019/s×100 s×10 m=0.19 m.

Based on the error budget in Table 1 a 0.6-m error over a 100 meter baseline would result in a 6 milli-radian azimuth error. This assumes the entire operation is completed in 100 seconds. The error budget assumes a very pessimistic situation for the assumed position error contribution and a worst case satellite Doppler change at the zenith of each satellite for each of the four satellites. It should be noted that such a situation is physically impossible to encounter.

Clearly, the accuracy of this system will degrade as the time to complete the traversal from the beginning to the end point is extended. However, the longer the baseline, the better the azimuth accuracy. But the longer the time interval for completing the traversal operation, the larger the accrued relative position error. Accordingly, better accuracy performance for any given application can be obtained by carefully balancing the appropriate operation parameters.

An alternate embodiment is also described herein that reduces the impact of the assumed position error for the acquired GPS constellation. The alternate embodiment begins by inspecting the measurement equation #1.

As described above, the time-relative positioning method described herein makes some approximations to equation #1, thereby yielding equation #2, in order to determine a position change over time. The approximation includes neglecting $[h(t_k)-h(t_0)]\cdot[x(t_0)-x^*]$, the second term on the right-hand side of equation #1 because of its negligible effect. The accuracy of the desired relative position solution $[x(t_k)-x(t_0)]$, as derived above in equation #2, depends greatly on minimizing $[x(t_0)-x^*]$ which represents the assumed position error as prescribed in equation #1.

Therefore, to reduce the assumed position error, a "calibration" procedure is proposed by occupying one of the end points of the baseline for a brief period of time. This "calibration" exploits the knowledge that the user is stationary during this process. To do so equation #1 is rewritten in the following way:

$$[\phi(t_k)-\phi(t_0)]-[d(x^*, t_k)-d(x^*, t_0)]=[h(t_k)-h(t_0)]\cdot[x(t_0)-x^*] \quad \text{Eq. \#4.}$$

The above process eliminates the first term on the right-hand side of equation #1 by way of assuming that $x(t_k)-x(t_0)=0$, since no motion is involved.

The accuracy of the estimate of the "calibrated position", $x(t_0)$, depends on how large $[h(t_k)-h(t_0)]$ becomes over the time interval $t_0$ to $t_k$. Variation in the accuracy of this estimate is dictated by the choice of satellite geometry available at the time Operationally, this procedure requires that the user to occupy one of the two points for a short period of time to establish the "calibrated position". This is used to improve the time relative positioning solution.

A variation of this operational implementation of the "calibration" procedure involves solving for the relative position $[x(t_k)-x(t_0)]$, as derived in equation #3. Operationally, this involves occupying a point in the vicinity of the baseline for a short time period. The relative positioning solution resulting from the static occupation is called a "calibration vector" and represents the relative positioning error introduced by the assumed position error. This calibration vector can then be applied to previous or subsequent relative positioning solutions that utilize a common satellite constellation. It is important to recognize that both the "calibration vector" and the "calibrated position" estimate are a function of user position and satellite geometry. Since the satellite geometry is constantly changing, the accuracy of a calibrated relative positioning solution is a function of both the spatial and temporal relationship between the calibration vector and the relative positioning vector.

The main benefit of solving these two quantities, the "calibrated position" and the relative position, separately is that no more than four carrier signals are required.

It should also be noted that the above described time-relative positioning method can be used with positioning information for the purpose of determining present position.

While particular embodiments of the present invention have been shown and described, it should be clear that changes and modifications may be made to such embodiments without departing from the true spirit of the invention. It is intended that the appended claims cover all such changes and modifications.

We claim:

1. A method of determining a time-relative positioning measurement between an initial position and a second position utilizing a single radio receiver having processing means, comprising the following steps:

signaling the start of the measurement after acquiring a given constellation of GPS satellites, the start of the measurement corresponding to an initial position;

recording carrier phase observations for each of the GPS satellites in the given constellation;

signaling the end of the measurement interval, the end of the measurement corresponding to a second position;

said second position not required to be known upon signaling the start of the measurement;

computationally processing the carrier phase observations from the given constellation to produce a solution vector between the initial position and the second position; and computationally estimating the quality of the solution vector produced by taking into consideration known error sources and the effects of satellite geometry for the given constellation.

2. The method of claim 1, wherein the recording of signals from the constellation of GPS satellites is comprised of recording the signals of four GPS satellites.

3. The method of claim 1, wherein at least one of the known error sources is a multi-path error assigned to each of the satellites in the GPS constellation.

4. The method of claim 1, wherein at least one of the known error sources is an ionosphere delay change assigned a value of zero based on a short time interval approximation.

5. A method of determining a time-relative positioning measurement utilizing a single GPS radio receiver, comprising the following steps:

signaling the start of the measurement after acquiring a given constellation of GPS satellite, the start of the measurement corresponding to an initial position;

recording the carrier phase observations for each of the GPS satellites in the given constellation;

signaling the end of the measurement interval, the end of the measurement corresponding to a second position;

performing a calibration determination by temporarily remaining stationary at one of the initial or second positions for the purpose of reducing assumed position error;

computationally processing the carrier phase observations from the given constellation to produce a solution vector; and computationally estimating the quality of the solution vector produced by taking into consideration known error sources and the effects of satellite geometry for the given constellation;

wherein the vector information represents a straight line between the initial position and the second position.

6. The method of claim 5, wherein the recording of signals from the constellation of GPS satellites is comprised of recording the signals of four GPS satellites.

7. The method of claim 5, further comprising the step of determining an intermediate vector while traversing between the initial position and the second position in order to provide a real time update of position with respect to previous positions.

8. The method of claim 5, wherein at least one of the known error sources is a multi-path error assigned to each of the satellites in the GPS constellation.

9. The method of claim 5, wherein at least one of the known error sources is an troposphere delay change assigned a value of zero.

* * * * *